United States Patent [19]

Skutta

[11] Patent Number: 5,055,924
[45] Date of Patent: Oct. 8, 1991

[54] REMOTE-CONTROLLED SUBSTITUTION OF A DEFINED PROGRAM PART OF A TV PROGRAM BY A SEPARATELY TRANSMITTED PROGRAM PART FOR DEFINED, SELECTED RECEIVERS, HOUSEHOLD TERMINAL FOR EXECUTING THE METHOD AND METHOD FOR OPERATING A HOUSEHOLD TERMINAL

[75] Inventor: Hans Skutta, Postbauer-Heng, Fed. Rep. of Germany

[73] Assignee: GFK GmbH, Fed. Rep. of Germany

[21] Appl. No.: 467,460

[22] Filed: Jan. 19, 1990

[30] Foreign Application Priority Data

Jan. 21, 1989 [DE] Fed. Rep. of Germany ....... 3901790

[51] Int. Cl.$^5$ .............................................. H04N 7/08
[52] U.S. Cl. ..................... 358/84; 358/181; 358/182; 358/142
[58] Field of Search ............... 358/142, 146, 147, 185, 358/181, 182, 84, 102; 360/12

[56] References Cited

U.S. PATENT DOCUMENTS

| | | | |
|---|---|---|---|
| 3,894,177 | 7/1975 | Howell et al. | |
| 4,329,675 | 5/1982 | Van Bulle | 358/185 |
| 4,488,179 | 12/1984 | Krüger et al. | 358/147 X |
| 4,821,101 | 4/1989 | Short | 358/185 X |
| 4,841,367 | 6/1989 | Ichikawa et al. | 358/181 |
| 4,888,638 | 12/1989 | Bohn | 358/85 X |

Primary Examiner—Victor R. Kostak

[57] ABSTRACT

In a method for the remote controlled substitution, in particular of a defined advertising spot by a test advertising spot for selected receivers, it has been provided that bi-phase modulated start codes are transmitted in the picture.lines outside of the TV picture visible on the video screen for the control of the address-distributed TV signals for the program part to be substituted. To execute this method, a household terminal in the form of an interposed device for commercially available TV receivers has been provided, which is distinguished by at least two tuners, the outputs of which are connected with a fade-over component, as well as a decoding circuit arrangement for decoding the switching code signals and for contact with the fade-over component. To achieve a field-exact switchover, i.e. one undetected by the viewer, a synchronous frame detector arrangement is additionally provided, which field-exactly switches over the fade-over component from the original program to the synchronously transmitted substitute program in the vertical black-out gap.

6 Claims, 3 Drawing Sheets

REMOTE-CONTROLLED SUBSTITUTION OF A DEFINED PROGRAM PART OF A TV PROGRAM BY A SEPARATELY TRANSMITTED PROGRAM PART FOR DEFINED, SELECTED RECEIVERS, HOUSEHOLD TERMINAL FOR EXECUTING THE METHOD AND METHOD FOR OPERATING A HOUSEHOLD TERMINAL

BACKGROUND OF THE INVENTION

1. Field of the Invention

The invention relates to a method for the remote-controlled replacement of a defined program part of a TV program by means of a separately transmitted program part for defined, selected receivers, in particular of a TV advertising spot by another advertising spot for a new product to be tested; to a household terminal in the form of an interposed device for commercially available TV receivers, in particular for executing this method, and to an operating method for such a household terminal with two tuners and an arrangement for detecting the operational state of a video recorder.

2. The Prior Art

For setting up market analyses, it is of considerable interest to see how certain items of TV advertising are perceived by the consumer and how they affect the buying habits of the consumer. Up to the present it has been known in this connection to show, in the course of a special showing, such advertising spots to a defined and selected number of persons, who were considered to be more or less representative, and to obtain the reactions of these test persons. However, such showings under special circumstances not related to everyday life either do not permit conclusions as to the spontaneous, non-reflexive reaction of the viewers or at most have results which have only limited values.

BRIEF SUMMARY OF THE INVENTION

In an effort to remove external influences on the behavior of the persons to be tested to the greatest extent possible and to be able to determine their actual buying reaction, applicant has initiated a new type of market testing survey where a completely novel method is being conceptualized in a community having a broadly representative composition of viewers and were all households to be considered are connected to cable TV. In this method, certain existing advertising spots are being replaced, by means of a control data telegram modulated onto an additional data carrier in a broad band cable net, by an advertising spot to be tested which is transmitted to selectively addressed households and has an advertising impact which is determined by repetition. To measure the reaction of such a new advertising spot for a generally new product, the advertised product is offered in the local shops and sales, and thereby the so-called advertising impact, are measured with the aid of so-called scanner registers. In this way it is possible to determine whether the households addressed by the advertising spot buy a larger proportion of a selected, advertised product, compared with households which were not addressed.

The disadvantages, technical and at the same time in respect to public opinion taking, of this method lie in the requirement for an additional control data carrier on the broadband cable net, which cannot be licensed over a long period of time, so that this method can only be realized in a few selected communities which are fully cable-equipped and which offer the necessary requirements from the points of view of technical requirements as well as the composition of the inhabitants.

However, for the extended use of this method, intrinsically extremely attractive as far a public opinion polls are concerned, it would be desirable to cover optional households, chosen purely on the basis of the criteria for public opinion polls, or to provide them with such advertising spots.

It is an object of the invention to transmit data telegrams for the part of the program which is to be substituted, having specially optimized, bi-phase modulated starting codes in the picture lines outside the TV image visible on the screen, for the control of the TV signals distributed by address. In this way transmission within the scope of the customary composite signal color correction (CSCC) becomes possible, so that optional TV receivers can be addressed within the covered area in optional local distribution, it being merely required that these TV receivers have a corresponding decoding device. Thus, the method according to the invention makes use of the fact that, for example, in accordance with the PAL recommendations 23 data and measuring signals are being transmitted, over and above the image information intended for the viewer, which customarily already contain video text information and VPS information for automatic video recorder programming. It is possible to place the code signal provided by the invention for the insertion and removal of a separate program part in the remaining free pictures lines not yet occupied by information. Besides the advantage of optional selection of the distribution of receivers on the basis of public opinion polls there is also the practical advantage that commercially available decoders can be used for decoding such coded signals, such as are already available for the VPS system, for example, so that to this extent the required additional apparatus can be realized in a very cost-effective manner. In an advantageous manner the start codes are superimposed on the existing picture information at the lower edge of the total transmitted TV picture which, in particular in a system operating in accordance with a European standard, permits the transmission of two data telegrams for each of the fields in picture lines 309, 310 and 622, 623, without conflicting with the already existing C.C.I.R. recommendations for the use of the lines at the upper edge of the picture.

This arrangement of the data telegrams has the advantage that, although this area is already occupied by picture information, it is assured that on the basis of customary set-up techniques for the TV picture this area is located outside of the visible area. This is based on the fact that TV technicians, when adjusting the TV picture, usually proceed by moving it up on the screen from the bottom until not even the last measuring signal line can be flickeringly perceived. This assures that the spare lines present at the lower edge do not get into the visible picture.

The invention also relates to a household terminal as an interposed device for TV receivers available on the market. Such interposed devices are already known per se for determining the operational mode of an associated TV receiver or video recorder and of the respective selected programs. These devices can be polled via a telephone line by means of an intermediate memory and a modem. A household terminal in accordance with the invention is distinguished by at least two tuners, the outputs of which are combined with a fade-over component as well as a decoding circuit arrangement for decoding the coded switching signal and for the control of the fade-over component. Provision of two such tuners in one interposed device makes it possible that in the respective household the TV receiver can be operated in the customary manner by remote control without acoustically perceived phase jumps occurring in the auxiliary sound carrier during switching. But the receiver present in the TV itself is deactivated and channel selection is made by means of the first tuner of the interposed device. The second tuner of the interposed device is set to the TV signal corresponding to the substitute program. Switching from one tuner to the other is triggered by the receipt of a start code signal in the decoding circuit arrangement, so that after such switching the latter receives the program received by the second tuner, for example an advertising spot, and feeds it into the TV receiver via the antenna input.

Furthermore, such a household terminal preferably includes a synchronization circuit arrangement for synchronizing the fade-over component, which detects the line synchronization pulses transmitted together with the CSCC. The synchronized frame detection arrangement can also see to it that a set number of line synchronization pulses is suppressed, so that only those picture lines are read in which a start code signal specific for the control data telegram can be expected.

It has been provided in particular that the synchronized frame detection arrangement field-synchronously switches the fade-over component from the original program to the synchronously transmitted substitute program in the vertical black-out gap. This makes possible field-synchronous switching, while avoiding picture interruption. A basic prerequisite for this is the synchronicity of the picture information transmitted via the original channel and the substitute channel, something which must be done in the central transmitter. A slow, i.e. on the order of 20 ms, lowering of the original sound signal and raising of the substitute sound signal achieves a lack of perception of the clicking noises because of amplitude jumps.

A third tuner in the household terminal may be required and be of advantage, if a video recorder is to be included which has no AV (audio-visual) output. In this case the third tuner is required to change the HF signal of the video recorder into the base band. Additionally, plug-in locations may be prepared in the household terminal into which additional tuners for TV signals with new standards can be plugged.

The invention also relates to a method for operating such a household terminal in which the operational state of a video recorder is also included, such a method being characterized in that the first tuner is set for receiving the original program and the second tuner for receiving the substitute program, in that the second tuner detects the frequency set at the video recorder by means of a scanning and comparison pass when the original program is being transmitted, the second tuner being continuously switched between a receiving mode and a scanning mode, and in that when a code signal for the substitute program is being received, the scanning operation by the second tuner is stopped and taken over by the first tuner. By means of this it is possible to receive the program set in the video recorder at all times with the required exactitude without use of a further tuner being required for this.

The invention will be described below by means of a preferred embodiment in connection with the drawings.

DESCRIPTION OF THE PREFERRED EMBODIMENT

Figure 1:
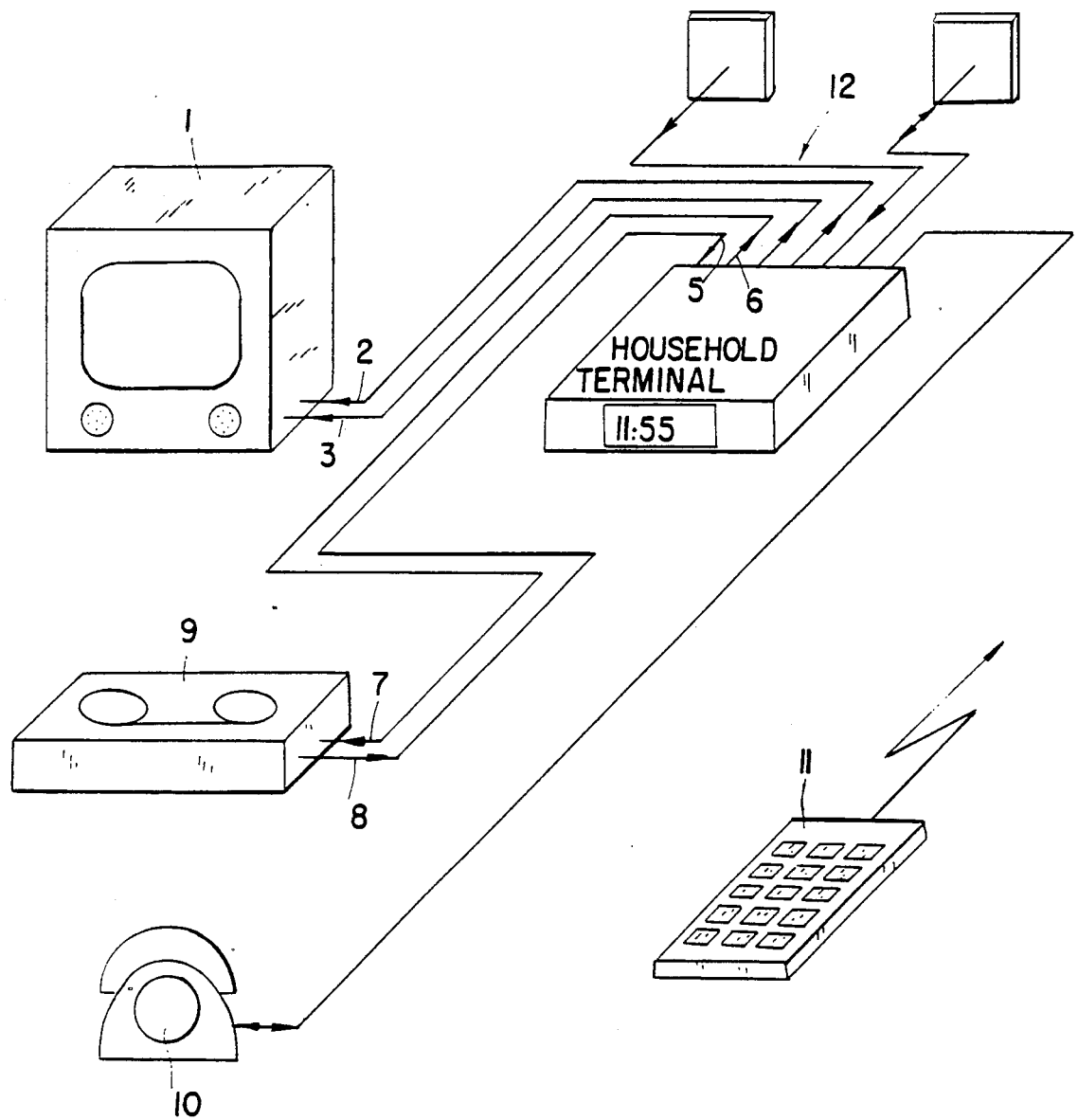
FIG. 1 is a schematic view of the essential components in connection with the method of the invention.

A commercially available TV receiver 1 is shown in FIG. 1, having a so-called AV input 2 and an antenna input 3. A device 4, designated as household terminal, is connected in series with it and is connected via an input 5 and an output 6 with the input 7 or the output 8 of a video recorder 9. The household terminal 4 is further connected via a modem, not shown, with a telephone 10 and can be remotely controlled by means of a remote control device 11 via a built-in receiver. The household terminal furthermore has inputs and outputs in the form of serial interfaces 12 for additional household terminals or for purposes of installation or service.

Figure 2:
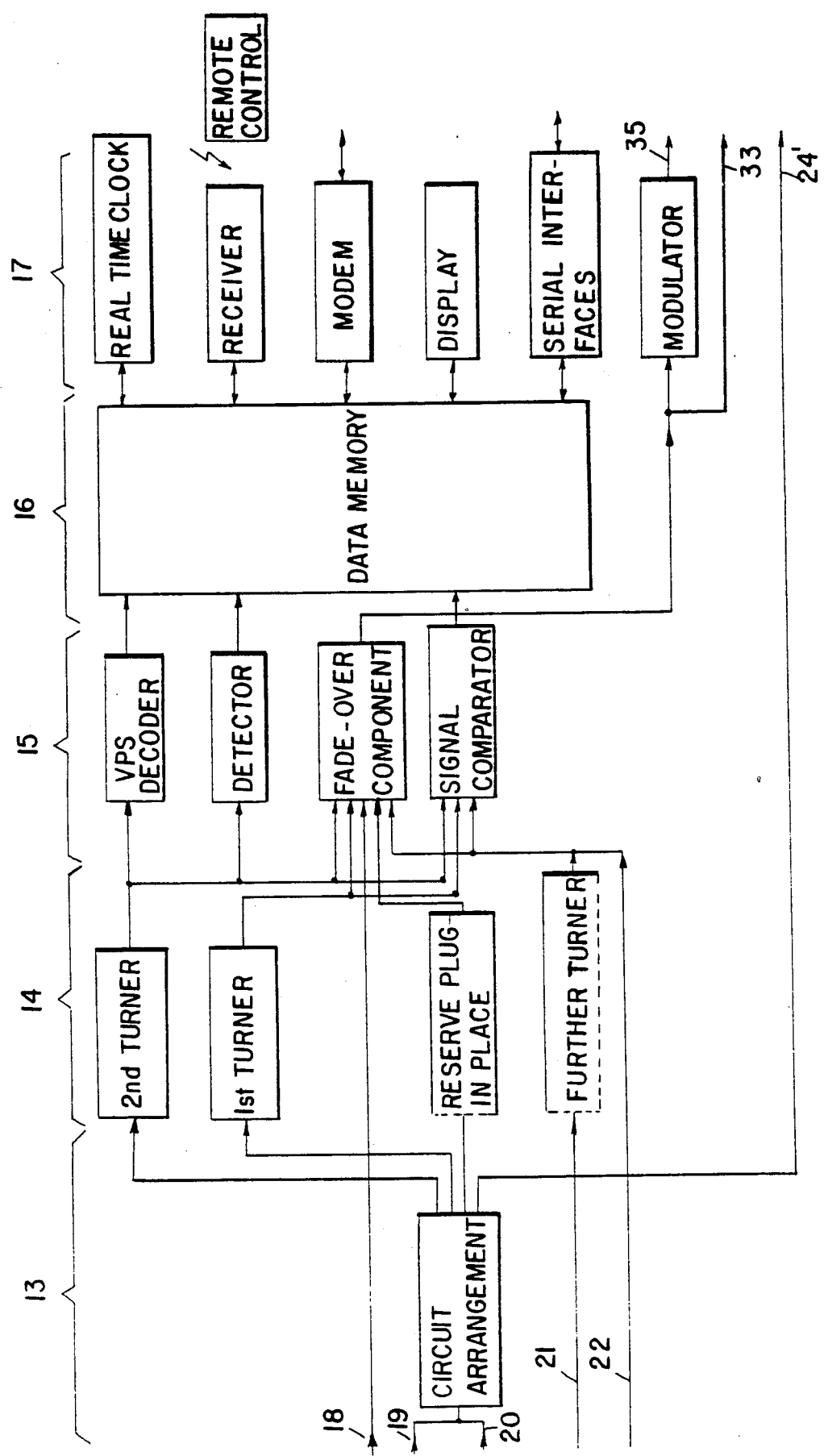
FIG. 2 is a wiring diagram-like view of a household terminal in accordance with the invention.

As shown in the wiring diagram-like illustration in FIG. 2, the household terminal 4 includes an HF signal preparation element 13, an HF signal processing element 14, a low frequency signal processing element 15, a control element 16 and a switching element 17 designed for additional functions.

The HF signal preparation element has a further AV input 18, a second HF (antenna) input 19, an antenna input 20, an input 21 for the antenna output of the video recorder and an input 22 for the AV output of the video recorder 9. A circuit arrangement 23 for the preparation of the signal, coming from a broadband cable connector, is switched downstream of the second HF input 19 and the antenna input 20.

The HF signal processing element 14 comprises a first tuner 24 for the so-called target channel, i.e. that channel on which the substitute program is being transmitted, as well as for control data and for the channel selection identification of the video recorder 9 in the manner described below. Furthermore, a second tuner 25 is provided for the channel respectively selected by the household or for the channel selection identification of the video recorder 9. Additionally, a reserve plug-in place 26 for one or several additional tuners for channels with new TV standards is provided. These tuners are placed downstream of the circuit arrangement 23. The circuit arrangement 23 also has an output which is connected with an output 24 to the antenna input of the video recorder. A further tuner 27 may be provided for the output channel of a video recorder without AV connection.

The low frequency signal processing element 15 comprises a decoding device for the data telegram of the substitute program to be faded in. i.e. in the simplest case a VPS decoder 28, known as such, but modified. Furthermore, a detector 29 for the synchronous frame of the TV signal is provided. Both, i.e. the decoder 28 and the detector 29 are placed downstream of the first tuner 24.

A fade-over component 30 is placed downstream of all tuners 24, 25 and, if required 26, 27, which is designed to make a field-exact switch between the first and second tuner, i.e. between the original program and the substitute program in accordance with the arrival of a data telegram.

The low frequency signal processing element 15 further comprises a signal comparator 31 for identifying the channel selection of the video recorder.

In general the control 16 comprises a central control logic with a data memory 32 and is connected with the outputs of the decoder 28, the detector 29 and the signal comparator 31. The fade-over component 30 is directly connected with an output 33 for the AV input of the TV receiver 1 and, via a modulator 34 for TV receivers without AV connection, with an output 35 to the antenna input of the TV receiver.

In the circuit element 17, a real time clock 36, a receiver 37 for the control signals of the remote control transmitter 11, a modem 38 for connection to the telephone net, a display 39 for program selection and for the representation of the persons present in front of the TV receiver 1, as well as the serial interface 12, already mentioned, for connection of additional household terminals and for installation purposes, are connected downstream of the central control.

Figure 3:
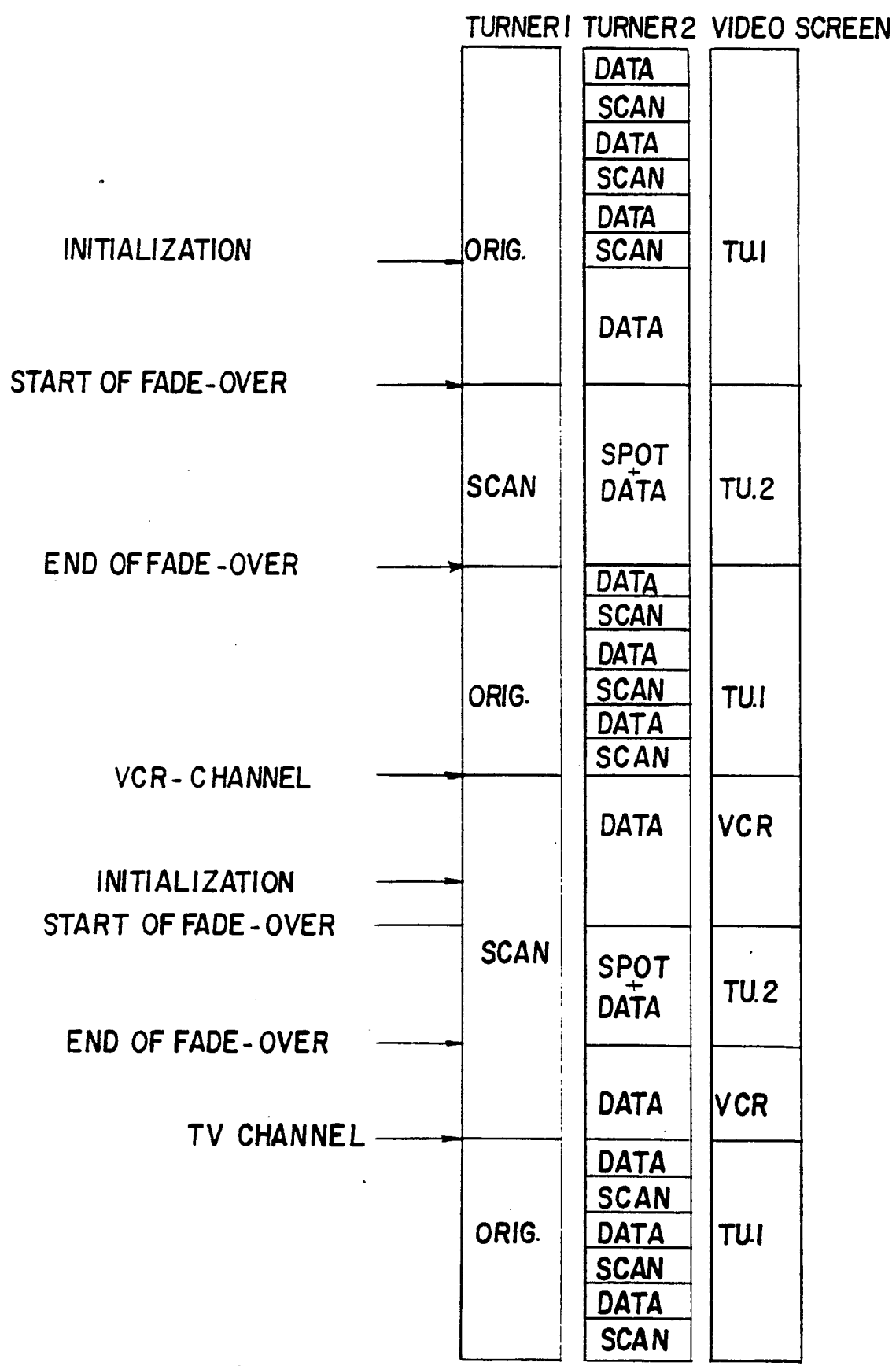
FIG. 3 is a time flow process diagram to show the operational method according to the invention.

The household terminal 4, described above in connection with FIG. 2, is operated in the manner shown by the time diagram in FIG. 3. The time axis is indicated from top to bottom, the left column showing the status of the first tuner, the central column the status of the second tuner and the right column the signal sent to the video screen. The successive status changes are shown to the left of the left column. In the diagram, the reception of the original program by a tuner is abbreviated as "Orig.", the performance of a scanning process for the detection of the selected channel as "Scan.", the polling of the transmitted data with "Data", the faded-in substitute program received from a tuner with "Spot" and the video recorder as "VCR".

The first tuner 24 provided in the HF signal processing element 14 supplies the channel selected by the household, i.e. the original program. The second tuner 25 is used to determine the actual channel of the connected video recorder 9. This is done with the aid of a signal comparator 31 which is able to determine agreement between the output signals of the video recorder 9 and the tuner 24 or 25 by determining the parity of both of the base band signals. This is preferably realized by comparing the two sound signals, advantageously only over a limited frequency range of, for example, 400 Hz to 1 kHz. If the difference of the two signals is sufficiently small, it can be assumed with relatively great probability that the same sound information and thus the identical channel is present in both. As a rule is can be concluded from this that the same picture information exists.

Beginning with the upper part of FIG. 3, first the original program is received by the first tuner 24, the second tuner 25 continuously changing with a fixed frequency of changes between the reception of data and a locating process (scanning pass) for determining the selected channel of the video recorder.

If fade-over is initialized by transmitting a start code, first no more scanning operations are performed in order to make possible a picture-synchronous reaction to the fade-over process by the alternate operation of the two tuners 24, 25.

After fade-over has started, the original program no longer needs to be received, because the output of the second tuner 25 which receives the faded-in advertising spot is put on the video screen. The first tuner 24 is available for the scanning operation which is now continuously performed by it. Free of interference, the second tuner 25 can await the end of the fade-over. At the end of the fade-over, the device again returns to the state described above and shown in the center in FIG. 3.

When the video recorder is switched on, which is initiated by selecting a set channel on the remote control 11, the first tuner 24 is freely available for the scanning operation, because reception of the original program is not required. Correspondingly, the second tuner 25 can permanently remain in a stand-by status for receiving data. Fade-over takes place, as shown in the lower part of FIG. 3, analogous to the TV reception. At the end of fade-over and after possible switch-back to TV reception, the state described above and shown at the very bottom in FIG. 3 is attained again.

I claim:

1. A method for the remote-controlled replacement of a defined program part of a TV program by a separately transmitted program part for defined, selected TV receivers, in particular of a TV advertising spot by another advertising spot of a new product to be tested, wherein said TV receivers comprise at least one antenna input and at least one output for the antenna input, comprising the steps of:

transmitting bi-phase-modulated start codes in the picture lines outside of the TV picture visible on the video screen for the control of the address-distributed TV signals for the program part to be substituted and connecting the outputs of at least two tuners (24, 25), with a fade-over component (30), and with a decoding circuit arrangement (28) for decoding the switching data telegrams and for contact with the fade-over component (30).

2. A method in accordance with claim 1, characterized in that the start codes are arranged at the lower edge of the total TV picture transmitted or at the corresponding picture information.

3. A method in accordance with claim 2, characterized in that two data telegrams with specific, optimized start codes are transmitted for each field in picture lines 309, 310 and 622, 623.

4. A method in accordance with claim 1 further comprising synchronizing the fade-over component (30) by a synchronous frame detector arrangement (29).

5. A method in accordance with claim 4, wherein the synchronous frame detector arrangement (29) field-synchronously switches the fade-over component (30) from the original program to the synchronously transmitted substitute program in the vertical black-out gap.

6. A method for operating a household terminal, with two tuners and an arrangement for detecting the operational state of a video recorder, characterized in that the first tuner is set for receiving the original program and the second tuner for receiving a substitute program, in that the second tuner detects the frequency set at the video recorder by means of a scanning and comparison pass when the original program is being transmitted, the second tuner being continuously switched between a receiving mode and a scanning mode, and in that when a code signal for the substitute program is being received, the scanning operation by the second tuner is stopped and taken over by the first tuner.

* * * * *